US009002925B2

(12) United States Patent
Roper et al.

(10) Patent No.: US 9,002,925 B2
(45) Date of Patent: Apr. 7, 2015

(54) SYSTEMS AND METHODS FOR COMMUNICATING BETWEEN COMPONENTS IN A HYBRID ENVIRONMENT

(75) Inventors: Matthew Roper, Cary, NC (US); Steven R. Perrin, Raleigh, NC (US); Scott E. Kelso, Cary, NC (US); Mark C. Davis, Durham, NC (US); Li Bin, Beijing (CN); Wang Sheng, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 250 days.

(21) Appl. No.: 12/978,534

(22) Filed: Dec. 24, 2010

(65) Prior Publication Data

US 2012/0166521 A1 Jun. 28, 2012

(51) Int. Cl.
*G06F 15/16* (2006.01)
*G06F 1/16* (2006.01)
*G06F 9/44* (2006.01)

(52) U.S. Cl.
CPC ............ *G06F 1/1616* (2013.01); *G06F 1/1626* (2013.01); *G06F 1/1654* (2013.01); *G06F 9/44* (2013.01)

(58) Field of Classification Search
USPC .......................................... 709/200, 203, 245
See application file for complete search history.

(56) References Cited

U.S. PATENT DOCUMENTS

| 6,212,564 | B1* | 4/2001 | Harter et al. ................... 709/228 |
| 6,473,789 | B1* | 10/2002 | Chen et al. ..................... 709/213 |
| 7,558,862 | B1* | 7/2009 | Tyukasz et al. ................ 709/227 |
| 2003/0112585 | A1* | 6/2003 | Silvester ........................ 361/679 |
| 2003/0198008 | A1* | 10/2003 | Leapman et al. .............. 361/681 |
| 2004/0104905 | A1* | 6/2004 | Chung et al. ................... 345/204 |
| 2010/0110893 | A1* | 5/2010 | Lee ................................ 370/241 |
| 2010/0306501 | A1* | 12/2010 | Chang et al. ..................... 712/31 |
| 2011/0320405 | A1* | 12/2011 | Hsu et al. ....................... 707/634 |

OTHER PUBLICATIONS

Peter Schmidt, Introduction to Internet Information Services 7.0, Sep. 19, 2007, www.windowsnetworking.com, 6 Pages.*

* cited by examiner

*Primary Examiner* — Douglas Blair
*Assistant Examiner* — Imran Moorad
(74) *Attorney, Agent, or Firm* — Ference & Associates LLC

(57) ABSTRACT

Systems and methods described herein provide for communication between a base component and a slate component of a hybrid computing system. The hybrid computing system is in a connected state when the base component and slate component are connected. Embodiments provide that the base component may control the slate component when the hybrid computing system is in a connected state. In addition, embodiments provide that a server module running on the display component and a client module running on the base component facilitate communication between the hybrid computing system components. Furthermore, systems and methods described herein provide that the base component may control hardware devices, peripheral devices, or software applications of the display component through communications between the server module and client module.

20 Claims, 7 Drawing Sheets

SYSTEMS AND METHODS FOR COMMUNICATING BETWEEN COMPONENTS IN A HYBRID ENVIRONMENT

BACKGROUND

The number and diversity of portable electronic devices are proliferating. In addition to established technologies, such as the laptop computer, many new form factors are constantly entering the marketplace, with a limited number eventually becoming popular with users. A recent example of a device whose use is becoming increasingly prevalent is the tablet computer. Although multiple forms exist, tablet computers generally consist of a housing that encompasses the internal computing components, such as processors and data storage devices, and a medium sized display screen (i.e., 7 to 10 inches). Instead of receiving input through the customary keyboard and mouse input devices, tablet devices generally lack these elements and instead provide user interaction through a touch interface on the display that accepts stylus or touch gestures.

Notwithstanding the popularity of new computing device form factors, such as tablet computers, the conventional clamshell laptop computer remains a standard portable computing device for a vast majority of users. An example of a clamshell laptop computer is the IdeaPad® series of personal computers sold by Lenovo (US) Inc. of Morrisville, N.C. IdeaPad® is a trademark of Lenovo, Inc. in the United States, other countries, or both.

Tablet and laptop computers each have their own set of advantages. For example, advantages for tablet computers include mobility and size, while primary reasons for preferring laptop computers include increased processing power and battery life.

BRIEF SUMMARY

In summary, one aspect provides a system comprising: a base device having one or more processors therein, the base device having a first operating system; a display device having one or more processors therein, the display device having a second operating system; one or more communication links between the base device and the display device; a server module running on one of the display device and the base device, the server module configured to provide a communication interface with one of the display device and the base device; and a client module running on the other of the display device and the base device, the client module configured to communicate with the server module; wherein responsive to connecting the display device to the base device, the base device controls the display device through communications transmitted between the client module and the server module.

Another aspect provides a method comprising: communicating information through one or more communication links between: a base device having one or more processors and a first operating system; and a display device having one or more processors and a second operating system; running a server module on one of the display device and the base device, the server module configured to provide a communication interface with one of the display device and the base device; and running a client module on the other of the display device and the base device, the client module configured to communicate with the server module; wherein responsive to connecting the display device to the base device, the base device controls the display device through communications transmitted between the client module and the server module.

A further aspect provides a computer program product comprising: a computer readable storage medium having computer readable program code embodied therewith, the computer readable program code comprising: computer readable program code configured to communicate information through one or more communication links between: a base device having one or more processors and a first operating system; and a display device having one or more processors and a second operating system; computer readable program code configured to run a server module on one of the display device and the base device, the server module configured to provide a communication interface with one of the display device and the base device; computer readable program code configured to run a client module on the other of the display device and the base device, the client module configured to communicate with the server module; and computer readable program code configured to transmit communications between the client module and the server module, the base device controlling the display device through the communications responsive to connecting the display device to the base device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

DETAILED DESCRIPTION

Figure 1:
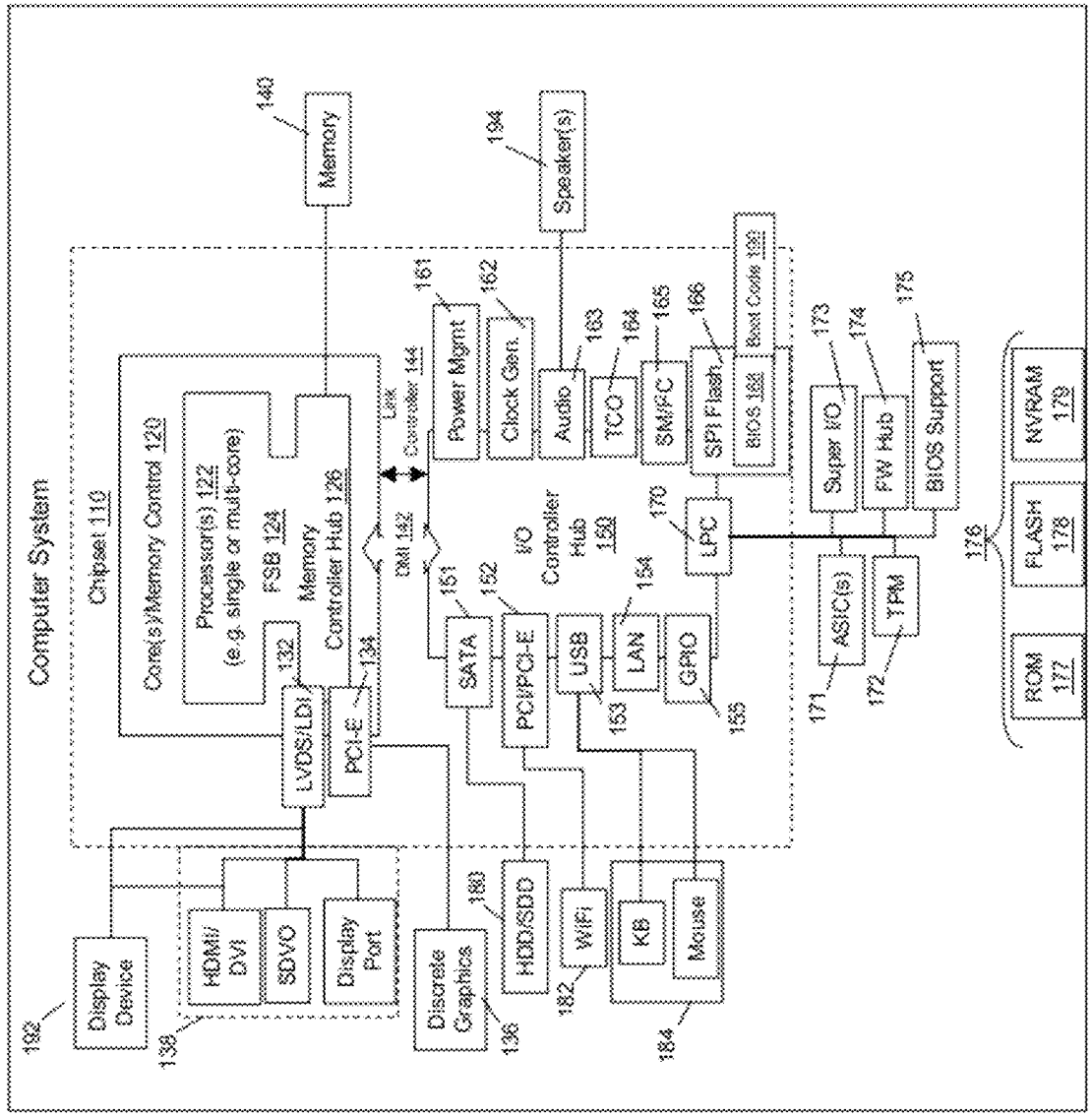
FIG. 1 illustrates an example circuitry of a hybrid computer system.

It will be readily understood that the components of the embodiments, as generally described and illustrated in the figures herein, may be arranged and designed in a wide variety of different configurations in addition to the described embodiments. Thus, the following more detailed description of the example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the example embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Tablet computers and laptop computers are different on many levels. The external structure of a clamshell laptop computer consists of two main components: a lower base and an upper display portion. The lower base is a housing for laptop hardware components, including one or more processors, a motherboard, memory, a keyboard, and pointing device(s). The upper display portion comprises a housing for the laptop display screen and other components, such as a camera, a wireless antenna and the like. The lower base and upper display portion are hingedly connected to allow for opening and closing the laptop computer.

Structurally, tablet or slate computers are generally smaller and more lightweight than laptop computers, consisting only of a single portion of a laptop computer. Tablet computers integrate the display with the typical lower base portion of a laptop computer, usually lack a physical keyboard, and often utilize a touch screen as an input device. In addition, typical tablet computers may be comprised of 7 to 10 inch displays, while the typical laptop computer display is 10 to 17 inches.

In addition to structural and operational differences, tablet and laptop computers also differ with respect to their internal software and hardware configurations. The typical laptop computer form factor houses a Win-Tel platform, comprised of an Intel x86 compatible processor and is capable of running a Microsoft WINDOWS operating system, such as WINDOWS 7 operating system. In comparison, tablet computers are most likely to run on lower powered processors and lighter weight operating systems specially designed for smaller devices. The lighter weight operating systems are often termed 'mobile operating systems' and are optimized for touch and content consumption instead of running large applications, such as the full version of the Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 is a registered trademark of Microsoft Corp. in the United States and/or other countries. ANDROID is a registered trademark of Google Inc. in the United States and/or other countries. SNAPDRAGON BY QUALCOMM is a registered trademark of Qualcomm Inc. in the United States and/or other countries.

Tablet and laptop computers each have their own set of advantages. Advantages for tablet computers include mobility, size, weight, and increased ease of use for certain functions, such as image manipulation. While primary reasons for preferring laptop computers are increased processing power and battery life, wider choice of operating systems and applications, and the presence of the standard keyboard and touch input devices. As such, it would be advantageous to provide a form factor that includes the functionality and features of both a laptop computer and a tablet computer in one single device.

Embodiments provide for a hybrid computing system consisting of a base device/component operably connected/coupled to a detachable/de-coupled display device/component, wherein the detachable display component includes the functionality of a slate/tablet computing device. According to embodiments, the base component may be comprised of the lower base of a clamshell laptop computing system, additionally having one or more interfaces (such as a connector) for connecting to the display component. Embodiments provide that the display component is comprised of a tablet computing device with one or more complementary interfaces (such as a connector) for connecting to the base component. According to embodiments, the display component may function as the display screen of the hybrid computing system when attached to the base component, and function as an independent tablet computer when not attached to the base component. Embodiments provide that the display component may be hingeably connected with the base component allowing for the opening and closing of the hybrid computing system.

The base component of hybrid computer system and the display component of hybrid computer system comprise various circuitry. While various other circuits or circuitry may be utilized, FIG. 1 depicts a block diagram of one example of a computer system and circuitry. For example, the circuitry depicted in FIG. 1 may be a circuitry included in base component of hybrid computing system, which may correspond to circuitry included in the IDEAPAD series of personal computers sold by Lenovo (US) Inc. of Morrisville, N.C. However, as is apparent from the description herein, components of the embodiments may include other features or only some of the features of the example system illustrated in FIG. 1.

The computer system of FIG. 1 includes a so-called chipset 110 (a group of integrated circuits, or chips, that work together, chipsets) with an architecture that may vary depending on manufacturer (for example, INTEL®, AMD®, ARM® etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to the display device/tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one embodiment, a single chip is used to supply BIOS like functionality and DRAM memory.

Figure 2:
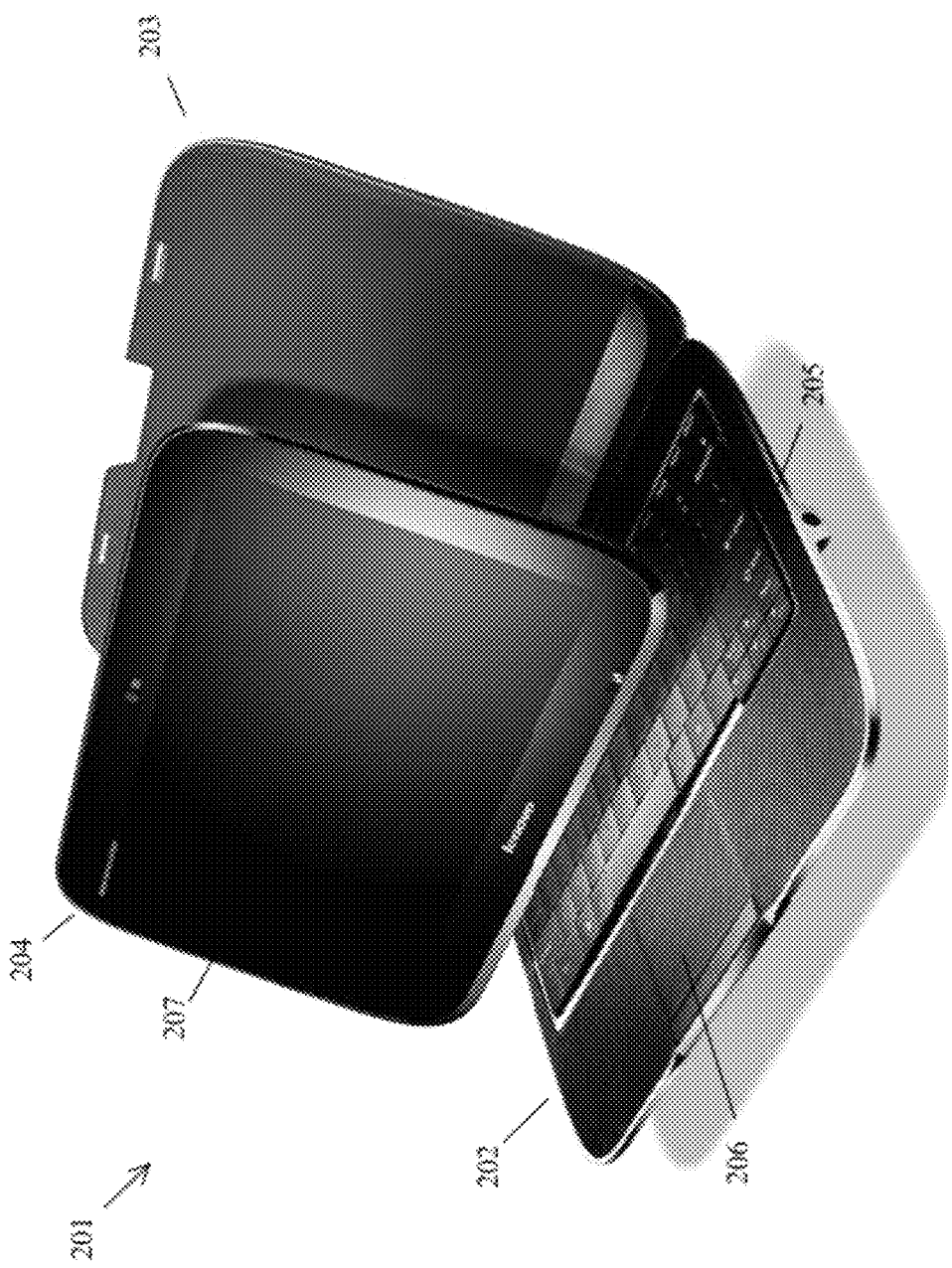
FIG. 2 illustrates an example hybrid computer system.

Referring to FIG. 2, therein is depicted an illustration of a hybrid computing system according to an embodiment. The hybrid computing system 201 includes a base device 202 and a display device/component 204. The base device 202 consists for example of a laptop circuitry such as described in connection with FIG. 1 and optionally a back plate 203 is included for supporting the display device 204 when connected to the base 202. The base device 202 itself has a physical keyboard 205, a touch pad 206, and a base connector element for connecting with the display component connector element. For its part, display device 204 is, for example, a detachable tablet and thus includes a touch screen interface 207, a light weight operating system, one or more processors, and the like.

Figure 3:
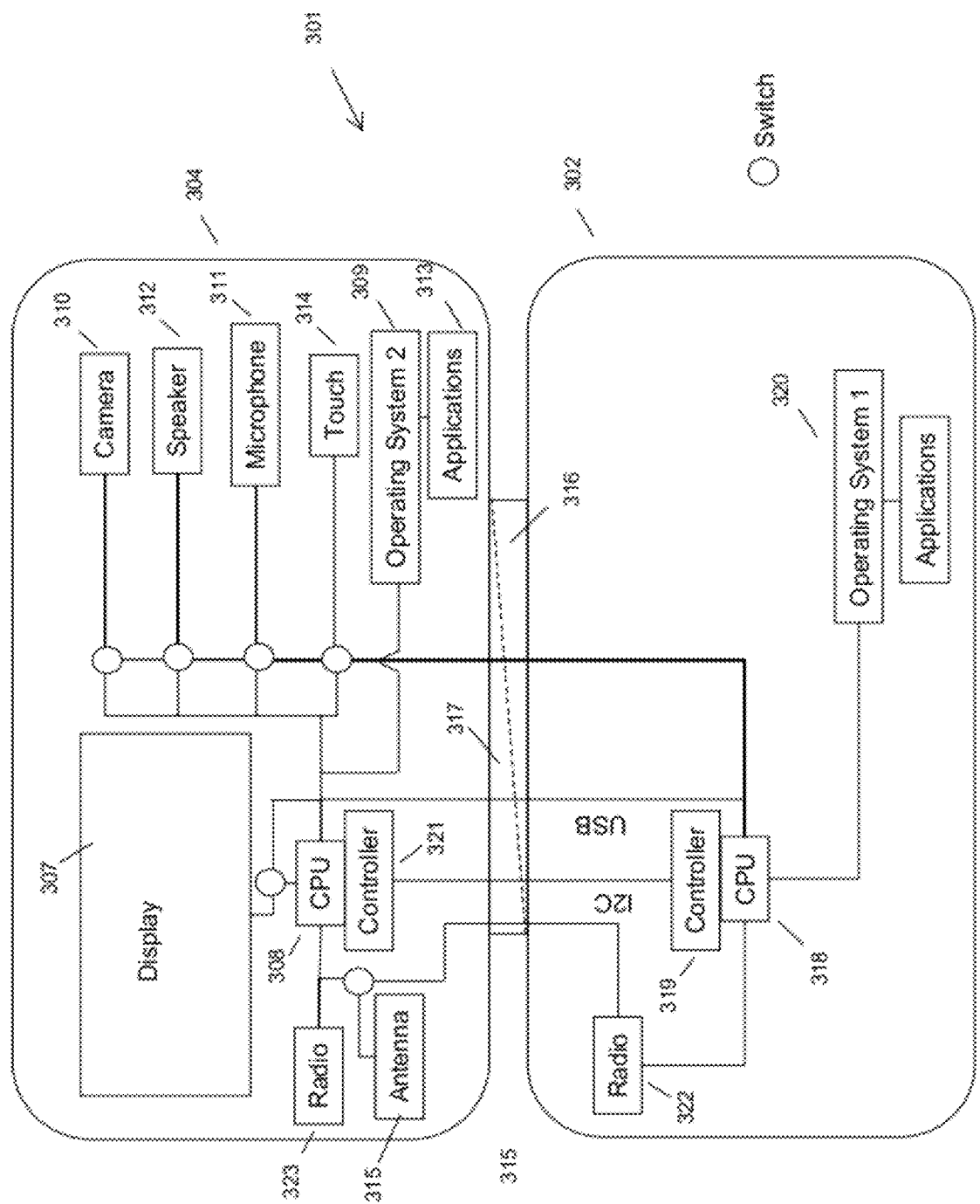
FIG. 3 illustrates an example hybrid computer system.

FIG. 3 provides an illustration of an example embodiment of a hybrid computing system. The hybrid computer system 301 has at least two states. For example, the hybrid computer system includes a connected state when the tablet 304 is connected to the base 302, and a disconnected state when the tablet 304 is not connected to the base 302.

When the hybrid computer system 301 is in the disconnected state, the tablet 304 operates as an independent tablet computer. As such, the tablet CPU 308 and the tablet operating system 309 control the operation of the tablet 304, including the display screen 307, peripherals such as a camera 310, microphone 311, speaker 312, shared wireless antenna 315, accelerometer (not shown), SD card (not shown), other similar peripheral devices, and tablet software applications 313. In the disconnected state, the tablet 304 uses the touch interface module 314 for user interaction through combined display and touch screen, and the shared wireless antenna 315 for network communications.

The hybrid computer system 301 assumes the connected state when the tablet 304 and the base 302 are connected, as for example through their respective connector elements 316, 317. In the example embodiment illustrated in FIG. 3, the connector elements include USB and I2C connections, as well as a power connection for charging tablet 304 battery (not shown) while it is connected to the base 302.

When in the connected state, the tablet and its peripherals are controlled by the base CPU 318, base controller 319, and base operating system 320. Essentially, the tablet 304 becomes a display device for the hybrid computer system 301 similar to the display component of a conventional laptop computer. As such, the tablet CPU 308 and tablet operating system 309 do not control, via controller 321, peripherals, when the hybrid computer system 301 is in the connected state, though the tablet operating system may be running in the connected state.

The base CPU 318, base controller 319, and base operating system 320 control the display screen 307 and any peripherals which may be located in the tablet 304. The base power system (not shown) charges the battery (not shown) located in the base 302 regardless of the connection state of the hybrid computer system 301. However, when the hybrid computer system is in the connected state, the base power system also charges the slate battery via a power connection element, which may be collocated with base connector element 316 and display connector element 317.

In a coupled environment, there are two computing systems, that is a primary system (base device 302), and a secondary system (display device 304 taking the form of a tablet). These systems share access to various peripheral devices and/or internal components, depending on the state (connected or disconnected). Each system is capable of operating independently.

In coordinating the primary and secondary systems in terms of controlling secondary system elements, including, but not limited to, secondary system hardware, peripherals, and software, one function is to ensure adequate communication between the devices. The base device controls the tablet device, including tablet device hardware, software, and peripheral devices, when the hybrid computing system is in the connected state. However, responsive to disconnection, the table acts independently and assumes controls of internal hardware, software, and peripheral devices such that it operates as an independent tablet computing device.

In order to coordinate control between the primary and secondary systems, embodiments provide systems and methods to ensure adequate communication. Communication takes place via a connection, which may be physical (wired) or wireless, and communications are exchanged according to one or more communication protocols.

The tablet 304 is a thin device with a display 307 and touch interface 314, with a few other connectors or buttons. A connector 317 on the tablet allows attaching it to the base device dock 316. Switching electronics ("switches" in FIG. 3) in the tablet 304 permit the display 307, touch interface 314, camera 310, microphone 311 and similar peripherals on the tablet 304 to be used by the base device 302 while the tablet 304 is attached. Power from the AC power supply attached to the base device 302 or power from the battery in the base device 302 can be used to charge the battery in the tablet 304.

Communications between the base 302 and the tablet 304 preferably take place at two levels. Control of machine-state, security and other hardware related functions is provided by communications between an embedded controller 318 in the base device 302 and controller 321 on the tablet 304. This communication link may use protocols like I2C or LPC. At a second level, higher bandwidth communications between the CPU 318 in the base device 302 and the CPU 308 in the tablet 304 can be used to move large amounts of data, such as video files. This link may use methods like USB, PCI express or Ethernet.

The connector 316, 317 between the tablet 302 and base 304 thus may include power connection, low speed communications, and high speed communications for data and peripheral devices. The connector 316, 317, along with other mechanical strengthening components such as a back plate 203 or socket support the tablet 302 when attached and allow operation as a clamshell type computer.

Figure 4:
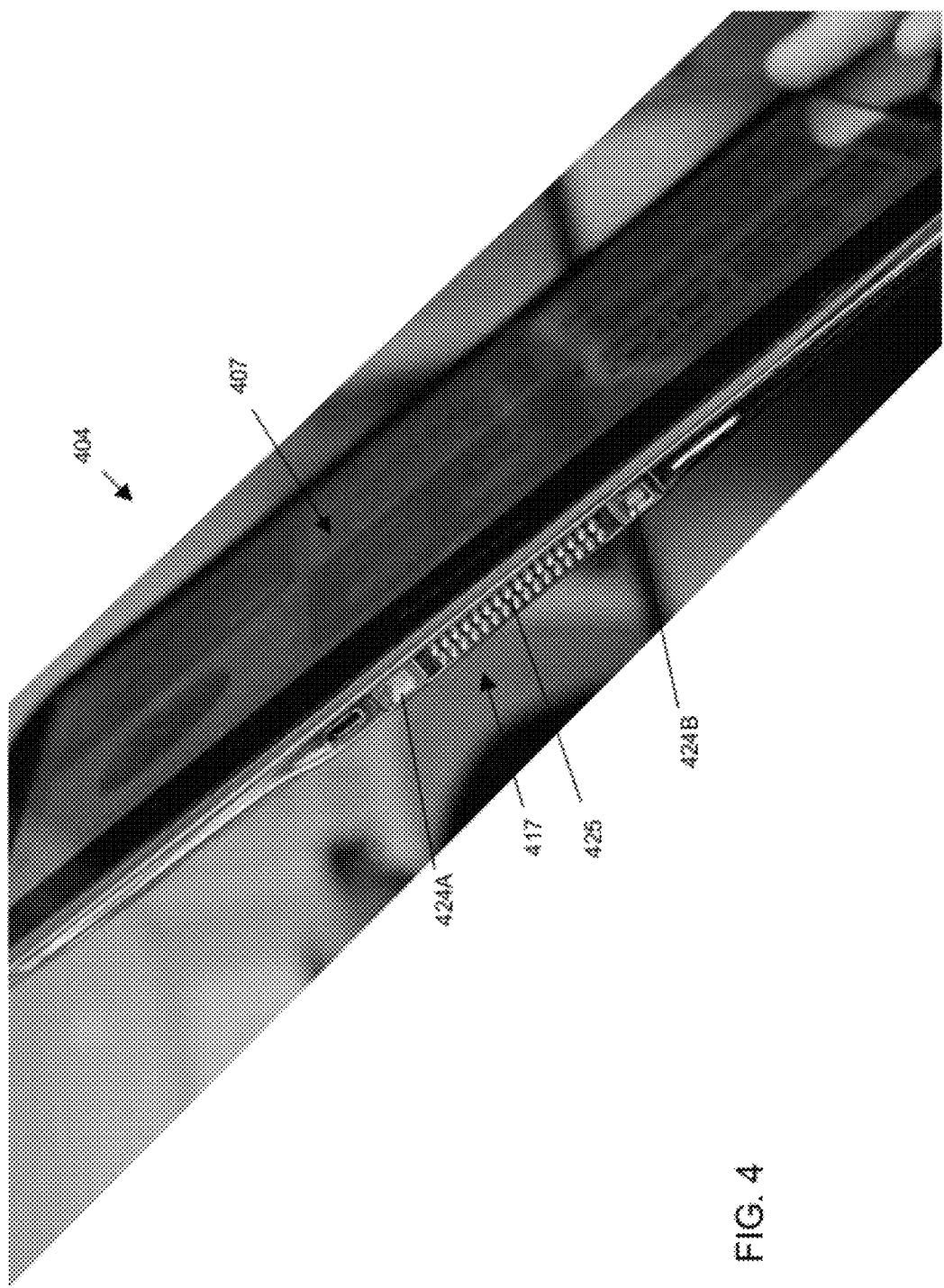
FIG. 4 illustrates an example connection on display device.

FIG. 4 illustrates an example connector element 417 on display device (tablet) 404. Tablet 404 includes a physical connector element 417 that includes inlets 424A, 424B for permitting insertion of mechanical strengthening components on complementary connector element of the base device. Furthermore, connector element 417 includes electrical connection portion 425 that supports communication links, for example between controllers of base device and tablet 404, as well as power connection(s), such as for charging battery of tablet 404. Tablet in disconnected state operates independently, including combined display/touch screen interface 407.

The slate and base components comprising the hybrid computing system must be able to communicate with each other when in a connected state. Embodiments provide for a Hybrid System Manager Service that facilitates communication between the slate and base components of the hybrid computing system. According to embodiments, the Hybrid System Manager Service operates to manage communication between the slate component and the base component through a server module running on the slate component and a client module running on the base component. However, it is not necessary that the server module run on the slate component and the client module run on the base component. As such, embodiments provide that the server module may run on the base component and the client module may run on the display component. The Hybrid System Manager Service may utilize HTTP for communication between the base and display components according to certain embodiments. However, other communication protocols, specifications, and transmission structures may be also be used either independently or in some combination thereof. Embodiments provide that the base component may control the slate component through HTTP communication between the two components.

Figure 5:
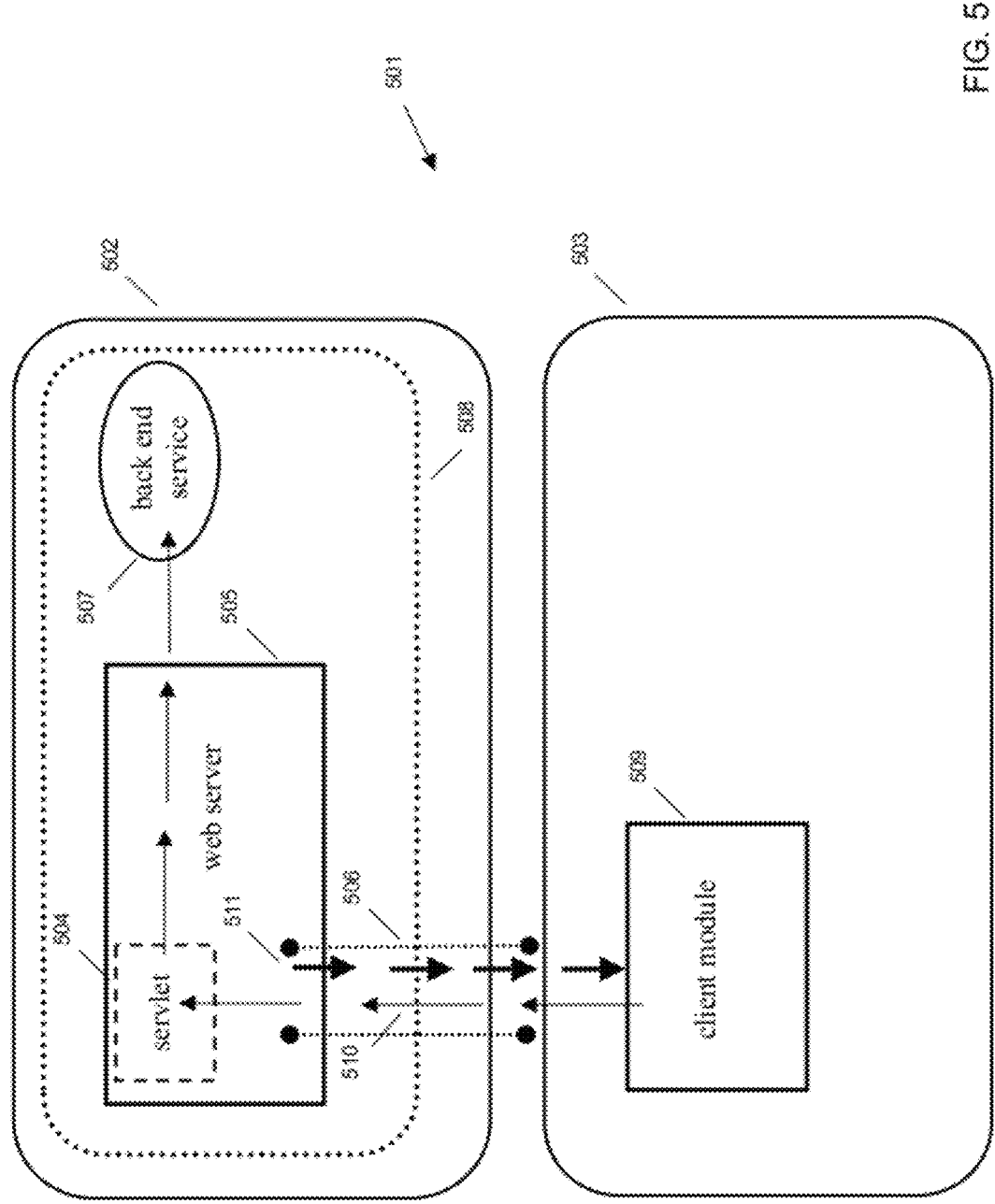
FIG. 5 illustrates an example of communication between hybrid computing system components.

Referring to FIG. 5, therein is depicted an example embodiment. A hybrid computing system 501 is illustrated that is comprised of a slate component 502 connected to a base component 503. The slate component 502 hosts a servlet 504 enabled web server 505 that provides an interface 506 to HTTP enabled clients. The servlet 504 runs in the web server 505 and provides HTTP communication. The web server 505 has a back end service 507 run by the slate component operating system 508. Communication is passed through the servlet 504 to the service 507. The base component 503 contains a client module 509 for communicating with the slate component 502 through the interface 506. As a non-limiting example, the base component 503 may communicate with the slate component 502 to control the state of hardware, peripheral, and software systems on the slate component 502. The base component 503 sends a request 510 to the web server 504 through the client module 509 and the web server 504 sends a response 511 back. Embodiments provide that the web server 505 may also support server based notifications to clients. In embodiments provided herein, the client is the base component 503. According to embodiments, the server based notifications to clients provides for, inter alia, notification to the base in real time of a configuration or state change on the slate component 502.

Figure 6:
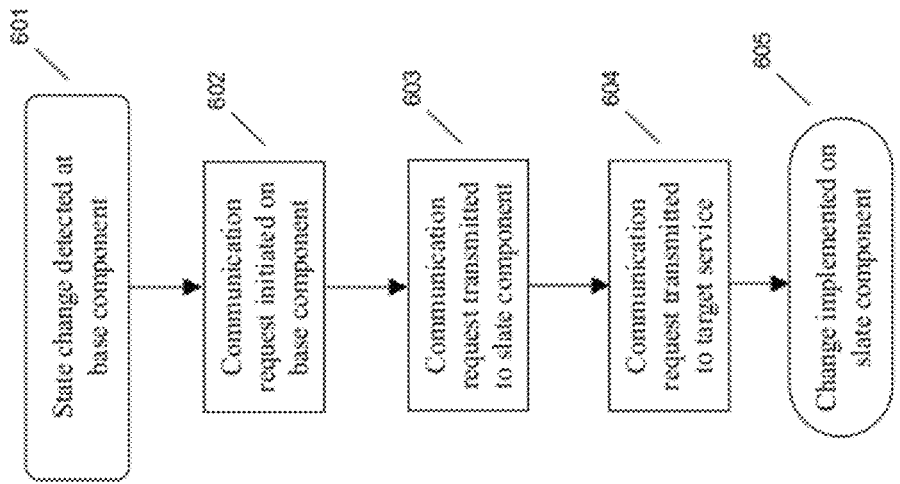
FIG. 6 provides a flow diagram of communication between hybrid computing system components.

Referring to FIG. 6, therein is depicted a flow diagram illustrating an example of communication between components of the hybrid computing system in the connected state. A state change on the base platform is detected 601. As a non-limiting example, the state change may be a change to the system locale of the hybrid computing system. The base communication module, which facilitates communication from the base component to the slate component, makes a communication request 602 containing information concerning the state change. The information sent in the request may include, but is not limited to, state change data and the slate component modules or services necessary to implement the change on the slate component. The communication request 602 may then be passed to the slate component 603 and to the service running on the slate component that will make the actual change on the slate component 604. The state change may then be implemented on the slate component 605.

Figure 7:
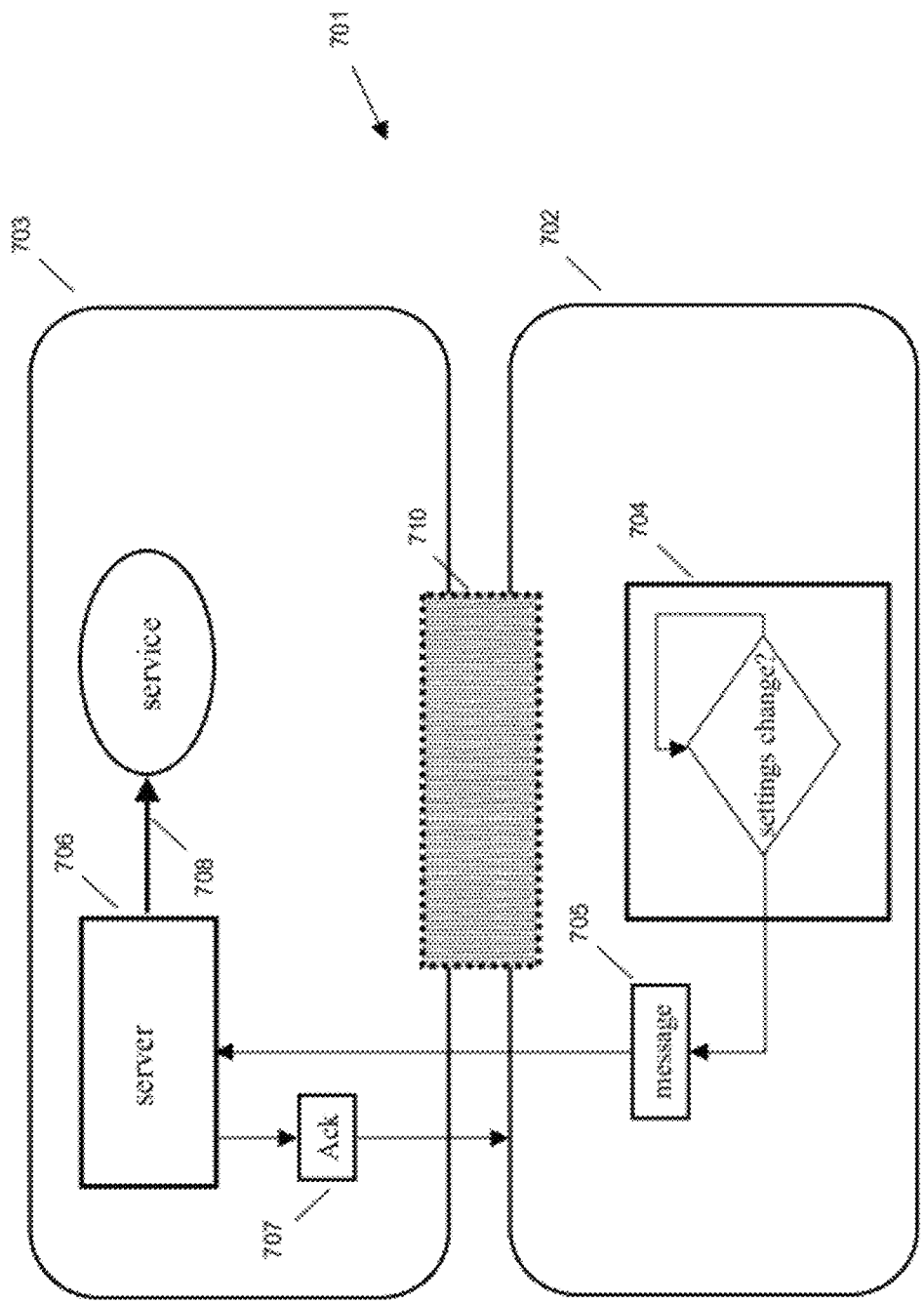
FIG. 7 illustrates another example of communication between hybrid computing system components.

Referring to FIG. 7, therein is illustrated an example of communicating a setting change according to an embodiment. A hybrid computing system 701 is in the connected state such that a base component 702 is operably coupled with a slate component 703 through one or more connector elements 710. Embodiments provide that the one or more connector elements may be physical or wireless connections. Modules 704 on the base component 702 watch for instances on the base component 702 that evoke communication to the display component 704.

In the non-limiting example embodiment depicted in FIG. 7, the instance is a settings change. However, communications from the base component 702 to the display component are not so limited, and may include, but are not limited to, the opening or closing of software applications, web pages, and documents. In addition, embodiments provide that the modules 704 may be hardware based, software based, or a combination thereof, and may be dedicated to watching certain settings or polling for settings changes at specific time intervals. Furthermore, embodiments provide that communication between the base component 702 and the slate component 703 may be continuous, as opposed to event-driven, such that component conditions may continuously be communicated between the base component 702 and the slate component 703.

When a change is detected, a message 705 is generated on the base component 702 and communicated to the server 706 running on the slate component 703. Additionally, the slate component 703 may acknowledge receipt 707 of the message and call the service 708 that will change the setting. As a non-limiting example, a user may change a display setting on the base system (e.g., brightness), this change is detected by a module 704 on the base computer 702 and communicated to the slate computer 703 as depicted in FIG. 7, such that the corresponding display setting on the slate component is modified accordingly.

According to embodiments, a server for facilitating communication runs on the slate component and a client process runs on the base component. Embodiments provide that the server may be a web server that facilitates HTTP communication. Embodiments provide that the base component may continually communicate data to the slate component when the hybrid computing system is in the connected state. In addition, embodiments provide that the communication between the base component and the slate component may be bi-directional such that if the server has information for the client, the server may send a message to the client to request the information.

The base and slate components may communicate using various methods. Embodiments provide that the base and slate components may communicate using methods including, but not limited to, USB, Ethernet, Wi-Fi, communication via Internet, or a combination thereof. As a non-limiting example, the base and slate components may communicate over a physical USB connection, then transfer communication to a wireless network connection upon being separated or moved further apart. As such, embodiments provide that a connection between the base and slate components may not necessarily be a physical connection, but may be a wireless or Internet connection.

When the hybrid computing system is connected, settings and information may be communicated from base component to slate component, from slate component to base component, or both. Embodiments provide for a continuity of user experience between interacting with the hybrid computing system in the connected state and the slate component in independent form. According to embodiments, transferred settings may include environment settings, including, but not limited to, display and audio settings. Embodiments also provide that information regarding operating system environment settings, such as web browser shortcuts and power settings, may be transferred. Embodiments may be configured to communicate which applications and web sites are active on a particular component. Embodiments may provide for the transfer of media files and their playback status. Embodiments may also be arranged to map applications in one component operating environment to the other component operating environment. As a non-limiting example, the base component may be running the WINDOWS 7 operating system and have a document open in the MICROSOFT WORD word processing application while the hybrid computing system is in a connected state. When the slate computer, which is running the ANDROID operating system, is disconnected from the hybrid computing system, the MICROSOFT WORD word processing application may be mapped to the corresponding QUICKOFFICE application running on the slate computer such that the document may be opened in QUICKWORD word processing application.

Embodiments provide for facilitating communication between a slate component and a base component of a hybrid computing system. According to embodiments, a Hybrid System Manager Service operates to manage communication between the slate component and the base component through a server module running on the slate component and a client module running on the base component. Embodiments provide that communication between components may be facilitated through HTTP. However, certain other embodiments provide that other communication protocols, specifications, and transmission structures may be utilized.

It should be understood that many of the functional characteristics of the embodiments described in this specification may be implemented as modules. Modules may include hardware circuits such as one or more processors with memory, programmable logic, and/or discrete components. The hardware circuits may perform hardwired logic functions, execute computer readable programs stored on non-signal storage devices, and/or execute programmed functions. The computer readable programs may in combination with other elements perform the functions of the embodiments.

It will be readily understood by those having ordinary skill in the art that embodiments may take the form of an entirely hardware embodiment or an embodiment containing both hardware and software elements. An embodiment that is implemented in software may include, but is not limited to, firmware, resident software, microcode, etc.

The computer readable programs may be stored any non-signal medium. Examples of a non-signal medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Accordingly, elements may be implemented on at least one electronic device running suitable software programs. These may also be implemented on at least one Integrated Circuit or part of at least one Integrated Circuit. Thus, it is to be understood that the embodiments may be implemented in a combination of both hardware and software. Again, computer/machine-readable programs may in combination with an electronic device perform the functions of the embodiments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth example embodiments and, although specific terms are used, the description thus given uses terminology in a generic and descriptive sense only and not for purposes of limitation.

What is claimed is:

1. A system comprising:
    a base device having one or more processors therein, the base device having a first operating system;
    a display device having one or more processors therein, the display device having a second operating system;
    one or more communication links between the base device and the display device;
    a server module running on one of the display device and the base device, the server module providing a communication interface with one of the display device and the base device; and
    a client module running on the other of the display device and the base device, the client module communicating with the server module;
    wherein responsive to mechanically coupling the display device to the base device, the base device controls the display device through communications transmitted from the client module to the server module.

2. The system according to claim 1, wherein the server module runs on the display device and the client module runs on the base device.

3. The system according to claim 2, wherein the base device controlling the display device comprises controlling one or more display device hardware devices, one or more display device peripheral devices, and one or more display device applications.

4. The system according to claim 2, wherein the base device controlling the display device through communications transmitted from the client module to the server module further comprises:
    one or more back end services running on the display device second operating system;
    wherein responsive to receiving one or more requests sent by the client module, the server passes the one or more requests to the one or more back end services, the one or more back end services implementing the one or more requests on the display device.

5. The system according to claim 4,
    wherein responsive to receiving one or more requests sent by the client module, the server module passes the one or more requests to one or more servlets running on the server module, the one or more servlets transmitting the one or more requests to the one or more back end services.

6. The system according to claim 5,
wherein the one or more requests are comprised of condition information and service information;
wherein the condition information comprises information designating one or more condition characteristics; and
wherein the service information comprises information indicating which of the one or more back end services are designated to implement the one or more requests.

7. The system according to claim 1, wherein the display device is a tablet computing device, and further wherein the communications transmitted from the client module to the server module comprise display settings information.

8. The system according to claim 1, wherein the server module comprises a web server.

9. The system according to claim 1, wherein the communications transmitted from the client module to the server module are transmitted using HTTP.

10. The system according to claim 9, wherein the server module supports server based notification to clients through which the server module communicates changes to the client module.

11. A method comprising:
communicating information through one or more communication links between: a base device having one or more processors and a first operating system; and a display device having one or more processors and a second operating system;
running a server module on one of the display device and the base device, the server module configured to provide a communication interface with one of the display device and the base device; and
running a client module on the other of the display device and the base device, the client module configured to communicate with the server module;
wherein responsive to mechanically coupling the display device to the base device, the base device controls the display device through communications transmitted from the client module to the server module.

12. The method according to claim 11, wherein the server module runs on the display device and the client module runs on the base device.

13. The method according to claim 12, wherein the base device controlling the display device comprises controlling one or more display device hardware devices, one or more display device peripheral devices, and one or more display device applications.

14. The method according to claim 12, wherein the base device controlling the display device through communications transmitted from the client module to the server module further comprises:
one or more back end services running on the display device second operating system;
wherein responsive to receiving one or more requests sent by the client module, the server module passes the one or more requests to the one or more back end services, the one or more back end services implementing the one or more requests on the display device.

15. The method according to claim 14,
wherein responsive to receiving one or more requests sent by the client module, the server module passes the one or more requests to one or more servlets running on the server module, the one or more servlets transmitting the one or more requests to the one or more back end services.

16. The method according to claim 15,
wherein the one or more requests are comprised of condition information and service information;
wherein the condition information comprises information designating one or more condition characteristics; and
wherein the service information comprises information indicating which of the one or more back end services are designated to implement the one or more requests.

17. The method according to claim 16,
wherein the one or more requests comprise a request to change a brightness display setting on the display device; and
wherein the condition information comprises a brightness level value and the service information comprises a designation of the one or more back end services that handle brightness display settings on the display device.

18. The method according to claim 11, wherein the server module comprises a web server.

19. The method according to claim 11, wherein the communications transmitted from the client module to the server module are transmitted using HTTP.

20. A computer program product comprising:
a computer readable storage device having computer readable program code embodied therewith, the computer readable program code comprising:
computer readable program code that communicates information through one or more communication links between: a base device having one or more processors and a first operating system; and a display device having one or more processors and a second operating system;
computer readable program code that runs a server module on one of the display device and the base device, the server module providing a communication interface with one of the display device and the base device;
computer readable program code that runs a client module on the other of the display device and the base device, the client module communicating with the server module; and
computer readable program code that transmits communications from the client module to the server module, the base device controlling the display device through the communications responsive to mechanically coupling the display device to the base device.

* * * * *